(No Model.)

H. C. SWAN.
SHAFT OR POLE EYE FOR VEHICLES.

No. 549,406.  Patented Nov. 5, 1895.

WITNESSES
Warren W. Swartz
W. B. Connor

INVENTOR
Henry C. Swan
by his attorneys
W. Bakewell & Sons

UNITED STATES PATENT OFFICE.

HENRY C. SWAN, OF OSHKOSH, WISCONSIN.

SHAFT OR POLE EYE FOR VEHICLES.

SPECIFICATION forming part of Letters Patent No. 549,406, dated November 5, 1895.

Application filed April 11, 1894. Serial No. 507,144. (No model.)

*To all whom it may concern:*

Be it known that I, HENRY C. SWAN, of Oshkosh, in the county of Winnebago and State of Wisconsin, have invented a new and useful Improvement in Shaft or Pole Eyes for Vehicles, of which the following is a full, clear, and exact description, reference being had to the accompanying drawings, forming part of this specification, in which—

Figure 1:
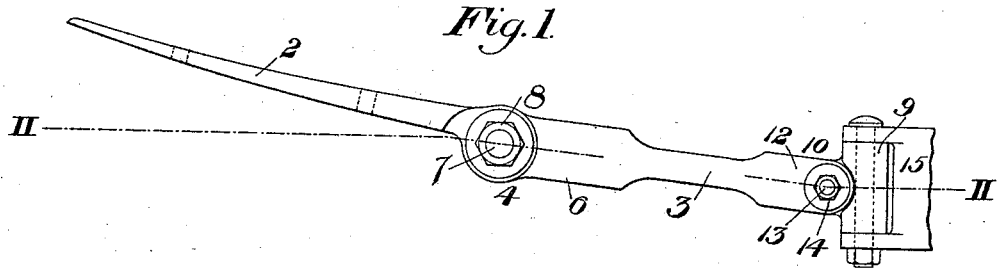
Figure 2:
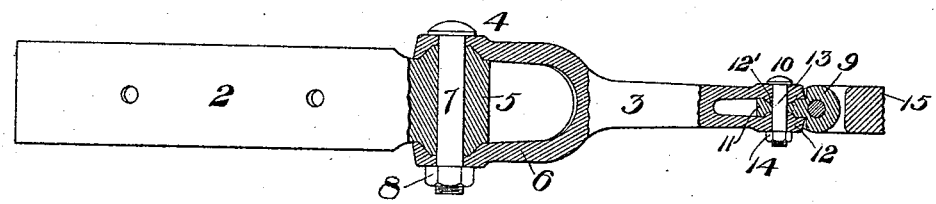
Figure 3:
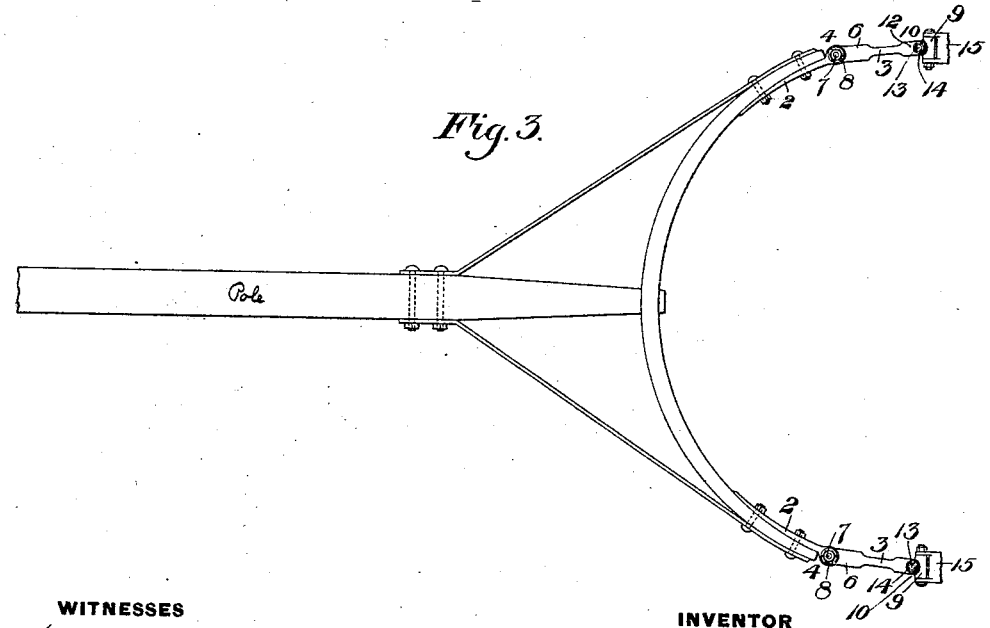

Figure 1 is a top plan view of my improved device. Fig. 2 is a sectional view on the line II II of Fig. 1, and Fig. 3 is a bottom plan view showing the vehicle-tongue provided with my improved device.

My invention relates to pole (or shaft) eyes of improved construction, attached to the rear ends of the cross-bar of the pole to form a connection with the vehicle, and adapted to be adjusted so as to suit vehicles in which the pole-eye shackles are different distances from each other. Its object is to render such adjustment easy and to provide a strong and durable construction.

In the drawings, 2 represents a plate adapted to be fixed to the end of the cross-bar of the pole, and having an extending arm 3, which is pivotally connected thereto by a joint 4, so as to be capable of lateral motion and adjustment. This joint is constituted by a central eye or barrel 5, having conical ends, and by a forked portion 6 of the arm 3, having conical eyes which fit over the conical ends and are held thereto by a bolt 7. The arm 3 is made of malleable metal, so that its forked end can be spread and then forced into place on the eye or barrel 5, and when the nut 8 on the bolt 7 is tightened it will bring the conical bearings into close contact, so that they shall operate as a wedge and secure the parts firmly together, thereby making the joint practically as rigid as if it were made of an integral piece. By loosening the nut, the pressure of contact of these parts is eased, and the arm may be turned horizontally on the joint 4, so as to bring it into the required adjustment.

The rear end of the arm 3 is connected with the pole-eye 9 by a pivotally-adjustable joint 10, constituted by an eye 11, with internally conical-bearing surfaces, a fork 12 with projecting conical thimbles 12', which fit in the eye, and a connecting bolt and nut 13 14, by means whereof the joint can be loosened, so as to permit lateral pivotal adjustment of the eye, and can be tightened so as to clamp the eye rigidly in the desired position. The pole-eye 9 is adapted to be connected pivotally with a shackle 15 on the vehicle.

It will be understood that the construction above described is for one of the ends of the cross-bar of the pole, and that the other end is similarly constructed, so that there shall be an eye at each end adapted to be engaged with the shackles 15 on the vehicle, as shown in Fig. 3.

In order to adjust the pole-eyes to suit the shackles of any vehicle, the bolts and nuts 7 8 and 13 14 are loosened, the arms 3 moved inwardly or outwardly, as the case may be, upon their joints 4, until the pole-eyes are at the same distance from each other as are the shackles on the vehicle, and the bolts and nuts 7 8 having been tightened so as to clamp the arms in this position, the pole-eyes are turned on their joints 10, so that they shall be in line with each other, and they are then clamped by tightening the bolts and nuts 13 14.

By the peculiar construction possessed by my improvement I avoid the necessity for expensive attachments, such as have been used heretofore in connection with adjustable pole-eyes, and I reduce the device to the use of two simple joints, which, when tightened, afford the rigidity needed in a device of this sort, I reduce the cost to a minimum, and I obtain a neater and less clumsy construction than has been known heretofore.

The advantages of my invention will be appreciated by those skilled in the art.

Within the scope of my invention as defined in the claims various changes in the construction and arrangement of the parts may be made by the skilled mechanic, since

What I claim is—

1. An adjustable shaft or pole coupling, comprising a pole-iron having an eye provided with tapering end portions, a laterally adjustable arm provided with a forked end having tapering recesses, said end being made of malleable metal adapted to be bent into place about the eye, and means for clamping the forks rigidly in place upon the eye, substantially as described.

2. An adjustable shaft or pole coupling for vehicles, comprising a pole-eye and a pivoted laterally adjustable arm bifurcated at each end and having tapering interfitting bearings with the pole and the pole-eye, and bolts arranged to clamp the bearings in adjusted position; substantially as described.

In testimony whereof I have hereunto set my hand.

HENRY C. SWAN.

Witnesses:
MARTIN O. SENSENY,
EMIL W. JAITE.